United States Patent [19]
Donica et al.

[11] Patent Number: 5,212,793
[45] Date of Patent: May 18, 1993

[54] GENERIC INITIATORS

[75] Inventors: Patricia A. Donica, Austin, Tex.; Stanley R. Shubert, Rochester, Minn.; Karl D. Schmitz, Pleasant Valley, N.Y.

[73] Assignee: International Business Machines Corp., Armonk, N.Y.

[21] Appl. No.: 754,812

[22] Filed: Sep. 4, 1991

[51] Int. Cl.[5] .............................. G06F 12/02
[52] U.S. Cl. ...................... 395/700; 395/425; 364/DIG. 1; 364/281.6; 364/281.8
[58] Field of Search ............... 364/DIG. 1; 395/425, 395/650, 700

[56] References Cited

U.S. PATENT DOCUMENTS

| | | | |
|---|---|---|---|
| 4,833,594 | 5/1989 | Familetti et al. | 364/DIG. 1 |
| 4,918,595 | 4/1990 | Kahn et al. | 395/650 |
| 4,943,913 | 7/1990 | Clark | 395/700 |
| 5,023,773 | 6/1991 | Baum et al. | 395/425 |
| 5,129,072 | 7/1992 | Larner et al. | 395/425 |

Primary Examiner—Thomas M. Heckler
Attorney, Agent, or Firm—Lawrence D. Cutter

[57] ABSTRACT

In order to reduce operating system overhead and to reduce the amount of time that work is queued in a computer operating system environment, flexibility enhancements are made to initiator address spaces allowing them to be created, destroyed, assigned, reassigned and reclaimed. Furthermore, initiator structures are provided with tailorable features which allow them to be readily tuned and honed for computer work associated with the particular classes or groups of work. A method for deployment of initiator address spaces is provided so as to meet response time goals set by system programmers and/or managers. Additionally, system operators are freed from the chore of real-time initiator management.

5 Claims, 6 Drawing Sheets

GENERIC INITIATORS

BACKGROUND OF THE INVENTION

The present invention is generally directed to computer operating systems and the management of system resources. More particularly, the invention is related to structures and management of virtual memory address spaces in a manner to reduce operating system overhead and to reduce the need for operator or operator substitute real time management of initiators. Additionally, the invention provides a mechanism for establishing and managing a pool of address spaces which are at least partially tailorable to specific operating system requests.

In a computer system having virtual memory capabilities and an operating system, it is necessary to isolate users from one another. A significantly useful mechanism for this purpose is the concept of an address space which represents the total amount of memory available to a user, it being understood that not all of the user's data is physically present in the main computer memory at any one instance of time. Rather, in accordance with well known virtual memory methods, different blocks of the user's data and/or program information are swapped in and out of main memory from slower memory devices, typically direct access storage devices.

For example, users of the time Sharing Option (TSO) of the MVS Operating System, developed and marketed by the assignee of the present invention, are in fact assigned a special address space for their transaction and programming needs every time such a user logs on to such a computer system. However, there is a significant amount of system overhead and administrative operations that must be performed in order to establish such an address space assigned to a particular user and having certain characteristics. It is this undesirable overhead which is reduced by the structures and processes employed in the present invention.

With respect to the MVS Operating System, there are two job entry subsystem (JES) means available for creating the address spaces assigned to specific users. Such address spaces are referred to as initiators in both the JES2 and JES3 environments. In the JES2 environment, operators have to start initiators using a specific command. Each initiator must be defined to a specific class or set of classes (see below for the discussion of what constitutes a class). The class is typically specified by the user by means of a job control language (JCL) statement submitted with the user's work. If the work submitted by the user is to run in class T, for example, and there are no class T initiators available, the work submitted by the user is not run until an initiator is started for this class. Initiators which are idle in other classes cannot be used.

In the JES3 Operating System environment, the manager of the computer installation, typically through a systems programmer, can define a job class group using the GROUP statement available for defining installation controls. The job control language material submitted by the user with the programs to be run associates it with a group containing one or more classes. For purposes herein, the group and class designations can be considered to be synonymous. For example, in JES3 each GROUP statement defines the characteristics of the group. That is, it specifies what devices are needed, the number of initiators to be dedicated to the group, and what processors the initiators are to run on. Initiators are dedicated to a group and cannot be used for scheduling any other job class group.

Initiator address spaces can also be created through an MVS START command. This method of starting an initiator is used by the Time Sharing Option (TSO) of the MVS Operating System, as mentioned above and is also used by system operators to start programs called "started tasks", in the new address spaces. These are sometimes called demand initiators and they result in the guaranteed start of an initiator address space bound to the specific work unit for which it was created. This work unit may be the specific task started or the particular user who has logged on to the system. The work unit does not wait beyond the time required to start the initiator address space. That is to say, the work started in this way is not really queued for execution. Additionally, the initiator started in this manner cannot be used for scheduling any other class or individual work unit.

It should be appreciated from the above that, there has been no automation or flexibility in the creation and allocation of initiator address spaces. Accordingly, computer system installation managers, system programmers and system operators have experienced the chore of managing initiator address spaces either individually or by class or group. Additionally, it has been difficult to specify response time goal and range information for the management of initiator address spaces. Thus, it is possible at various times in a computer installation to have either too few or too many initiator address spaces defined. If too few initiator address spaces are in existence, then new work coming into the system repeatedly requires the creation of such address spaces or the work waits until an existing and eligible initiator completes a previous unit of work. Likewise, the termination of such work can often trigger the destruction of initiators or lend to excessive idle initiators unable to process other work. Since the formation of new initiator address spaces consumes relatively large amounts of system overhead time, it should be clearly appreciated that the repeated creation and destruction of such spaces represents a non-optimal utilization of computer system resources. Likewise, if too many initiators are created and defined, then system resources are also unnecessarily consumed. This could have a negative impact on throughput and performance of other tasks and jobs being performed by the system whose memory resources are diminished by the excessive number of initiators in existence. Additionally, it is seen that initiators have not heretofore been reused for different classes of work than those to which they were originally bound (assigned).

SUMMARY OF THE INVENTION

In accordance with a preferred embodiment of the present invention, initiators are saved and reused thus resulting in a significant reduction in system overhead for reuse as compared with significant amounts of system overhead for the starting and stopping (creation and destruction) of initiator address spaces. In order to accomplish this objective, initiators are created with fixed and tailorable features which allow them to be readily tuned and honed for computer work associated with particular classes and/or groups.

In a computer system having an operating system and virtual memory capability, unassigned initiator address spaces are created as necessary in accordance with installation supplied parameters. This initial creation is typically employed as a part of an initiator pool from which the operating system may draw to achieve the goals requested by jobs and tasks which are to be executed under control of the operating system. Accordingly, one of the pieces of information stored within control blocks accessible to the operating system is an indication as to whether or not an initiator address space is in an idle state. Additionally, the address space is linked to (via control blocks) fixed operating system control information which is applicable to programs to be run in the address space. When the address space is needed, that is when it must be assigned to a particular job or task or other work unit in the computer system, the address space control blocks are then tailored to specific particular classes of work to be performed by the computer system. Thereafter, the tailored address space is assigned to the specific work unit. It is no longer necessary to create a brand new initiator address space for every unit of work that is requested. Instead a pool of generic initiators is generally available ahead of time. Thus, operating system overhead is significantly reduced because it is no longer necessary to repeatedly create and destroy initiator address spaces the formation of which requires undesirably large amounts of operating system time. Nor is it necessary for work units to wait an undue amount of time for an existing initiator to become free.

Additionally, the invention provides a method for managing the pool of generic initiators. A method is provided for the computer operating system to control initiator creation, destruction, assignment, reassignment and reclamation so the system operator is no longer burdened with the manual control of such address spaces. Accordingly, the invention provides relief from a systems management burden. Moreover, the construction of generic initiator address spaces provides a mechanism for establishing predefined installation goal values that may be changed from time to time to reflect different system work load requirements. System installation personnel are now able to specify response time goals for each class or group. These goals are employed in the present invention to provide a "mean time to wait" measurement that is now usable in a heuristic fashion to control initiator assignments. If these goals are in danger of not being met, there is now a control mechanism which exists to permit the automatic redeployment of initiators from a generic pool or redeployment of initiators that become idle from another class. Additional mechanisms are also provided in applicants' method for the termination of excessive numbers of idle initiators.

Accordingly, it is an object of the present invention to provide generic initiator address spaces residing in one or more resource pools accessible to a computer operating system.

It is also an object of the present invention to increase computer system throughput and to reduce the amount of time that work units remain queued.

It is also an object of the present invention to reduce the burden of initiator construction and termination thus reducing the overhead associated therewith.

It is yet another object of the present invention to eliminate the manual control of initiator address spaces.

It a still further object of the present invention to provide a mechanism for computer installation personnel to more particularly specify system goals for specified classes of computer system work units.

It is a still further object of the present invention to provide a mechanism for a computer operating system to reuse idle initiators from a generic pool when such is demanded by the computer work load.

It is also an object of the present invention to reduce the number of times that initiator address spaces are created or terminated.

Lastly, but not limited hereto, it is an object of the present invention to provide a structure and mechanism for work load balancing.

DESCRIPTION OF THE FIGURES

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION OF THE INVENTION

Figure 1:
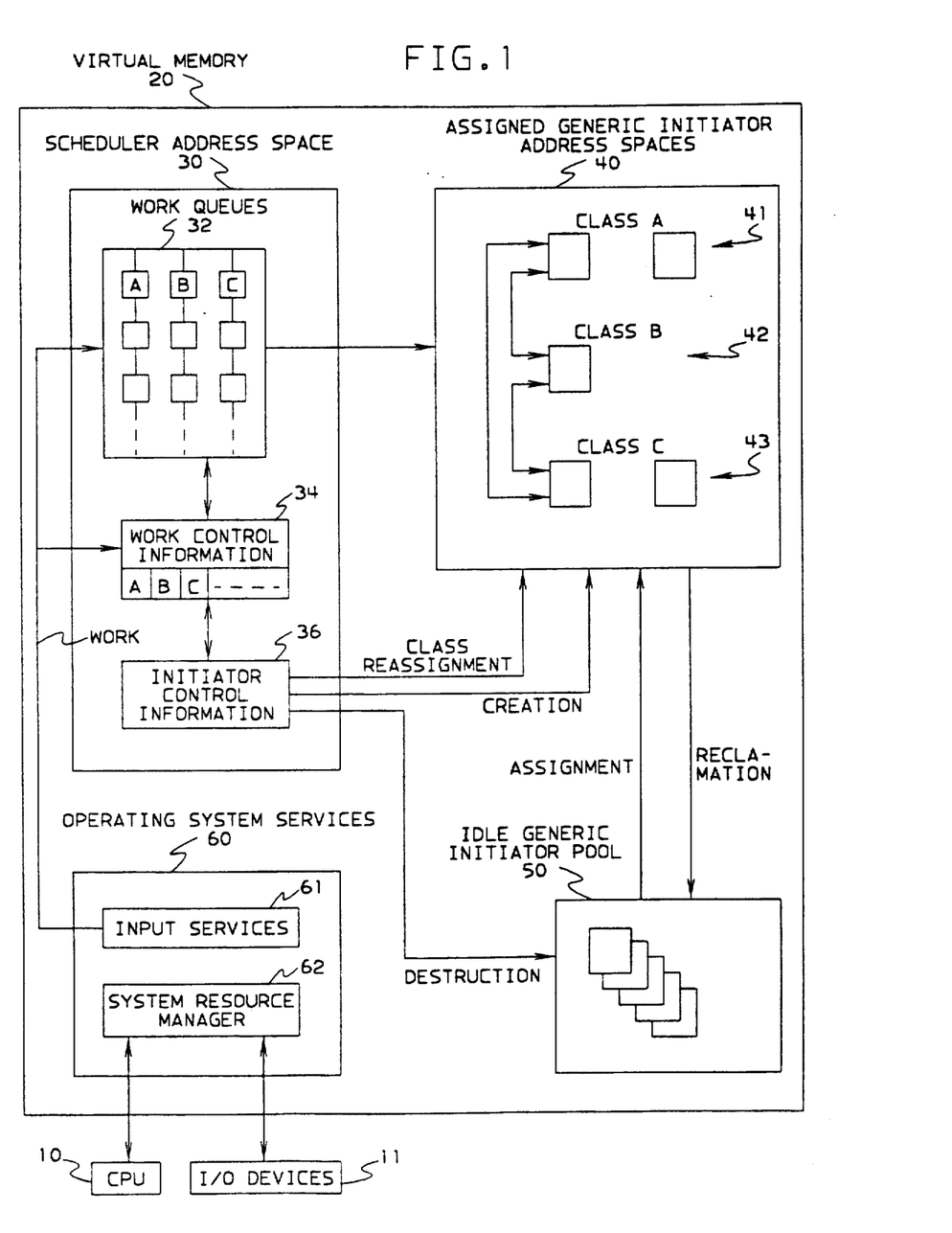
FIG. 1 is an overall block diagram illustrating the relationships between initiator address spaces and the environment in which they are employed.

FIG. 1 illustrates, in block diagram overview form, the flow of information signals in a computer system having virtual memory in which the present invention is employed. In particular, it is seen that central processing unit (CPU) 10 interacts with virtual memory 20. Within virtual memory 20, there is disposed an operating system which includes a number of components most of which are not relevant for the practice of the present invention. However, the operating system includes Operating System Services block 60 which includes Input Services 61 and System Resource Manager (SRM) 62. These are well known parts of operating systems. In relevant part, CPU 10 communicates with the operating system through System Resource Manager 62 and ultimately with I/O devices 11 therethrough. I/O devices 11 typically include direct access storage devices (DASD) which are used to provide longer term memory for virtual memory frames which are swapped in and out of virtual memory 20 in accordance with the demands of System Resource Manager 62.

Also included within Operating System Services block 60 is the Input Service mechanism 61. This service typically operates to supply to operating system components work units that are stored on DASD devices. In particular, Input Service 11 supplies work to the operating system scheduler which runs in Scheduler Address Space 30. When work is supplied to Scheduler Address Space 30, the work is generally divided into various work classes or work groups. Different classes are present as a result of the fact that there are requests for different system resources. For example, job control language (JCL) statements provided by an end user may specify region size, amount of output, file references, or the time allowed until the job is cancellable. Similarly, System Resource Manager (SRM) function 62 may specify information such as account data or time stamp information. These things too may affect the specific work class into which the work is placed. Accordingly, the scheduler establishes within Scheduler Address Space 30 a plurality of work queues 32 which are associated with different work classes. Herein, these classes are referred to as class A, class B, class C, etc. for ease of discussion. Associated with each job or task in work queue 32, there is corresponding work control information 34 (A, B, C, etc . . . as shown in block 34). Scheduler Address Space 30 also includes control blocks 36 which contain initiator control information. These are shown in more detail in FIG. 2. Information within block 36 controls distribution of initiators by class; it affects creation of initiators, assignment of initiators from the idle generic pool 50, the destruction of initiators and the return of initiators to pool 50 when not needed. This process and the conditions under which initiators are deployed is described in more detail below.

In addition to Scheduler Address Space 30, FIG. 1 also illustrates the presence of a plurality of initiator address spaces 40 separate from Scheduler Address Space 30. Address spaces 40 include a plurality of initiators, which can be considered to be uniquely controllable address spaces. In particular, FIG. 1 illustrates that assigned generic initiator address spaces 40 fall into a number of different classes, class A, class B and class C, referred to therein as 41, 42, and 43 respectively. The address spaces within block 40 of address spaces are those initiator address spaces which have been assigned to specific classes of work as determined by the information in work control block 34 and also by operation of the initiator deployment strategy which is effected by the scheduler operating in accordance with the method of the present invention. Additionally, it is noted that FIG. 1 illustrates the presence of another pool of address spaces 50 referred to therein as the idle generic initiator pool. This is a collection of address spaces which are not presently indicated as being assigned for work to a specific class. Additionally, initiators in address space pool 50 are identified with respect to their idle status, either directly or indirectly, by idle status information contained within control block 36 within schedule address space 30.

In order to render the subsequent discussion of assigned generic initiator address spaces and unassigned idle generic initiator address spaces more tractable, in the discussion below, initiator address spaces are also referred to more simply as "initiators".

Figure 2:
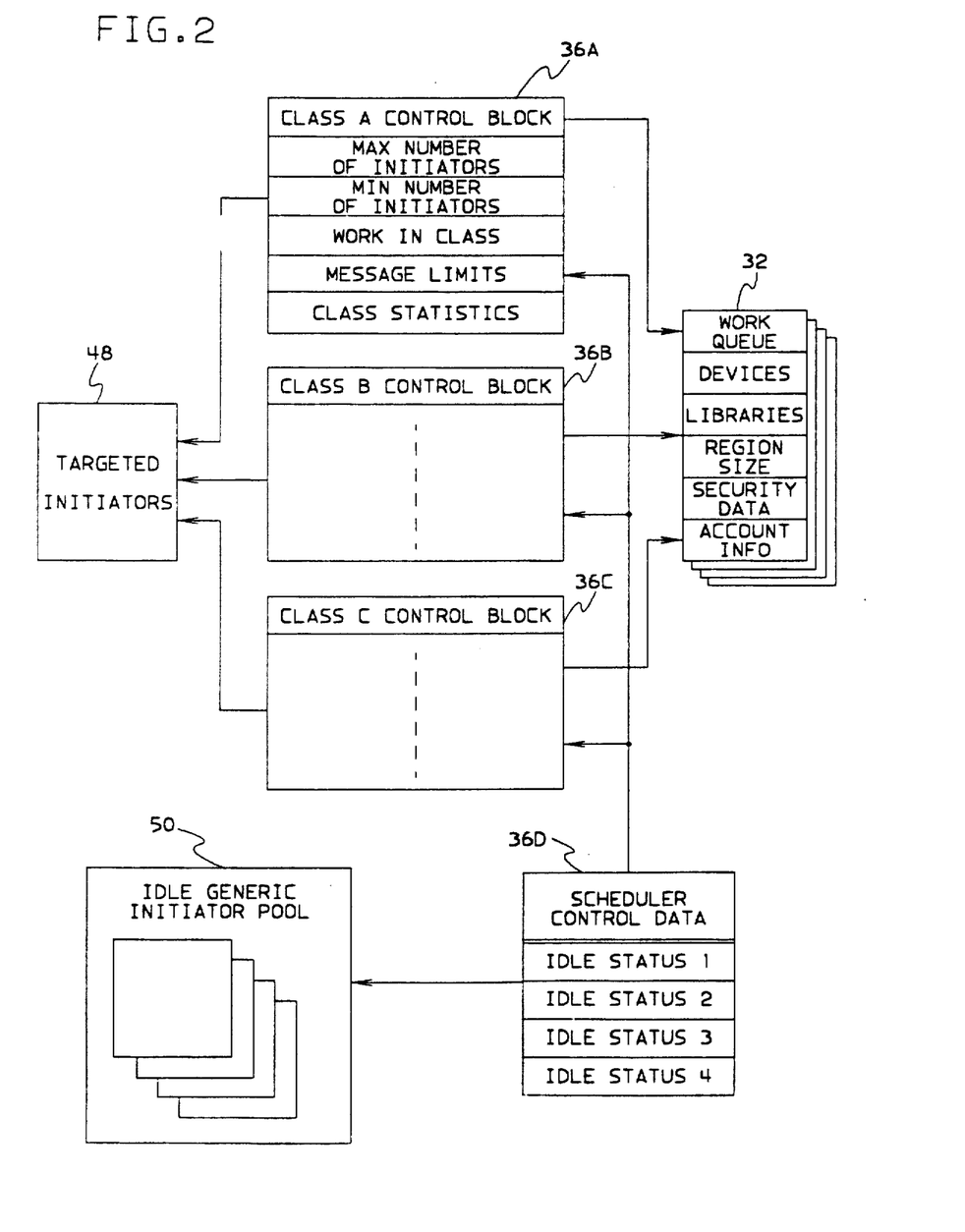
FIG. 2 is a block diagram illustrating more specifically initiator control information used to control initiator assignment, reassignment, creation, destruction and reclamation.

In the process of assigning idle initiators from pool 50 to a specific assigned class, certain control information is established. FIG. 2 provides a detailed description of some of this control information contained within control block 36. It is noted that even though block 36 may be referred to herein as a single block of information, it may in fact comprise a number of different control blocks, such as those preferable ones shown in FIG. 2.

In particular, for each assigned initiator there exists a class control block. For initiators assigned to class A, there is shown class A control block 36a. This control block contains information indicating the maximum and minimum number of initiators, message limit information, what work is in the class and class statistics indicative of how well the class is performing in meeting its response time goals. Data from System Resource Manager 62 particularly includes account name and account number. It is this kind of information which is used to tailor an initiator which is assigned from the generic pool to a particular work class or which is assigned from another class. Accordingly, control blocks 36a, 36b and 36c provide a signal link between assigned initiators 40 and work queue 32. Additionally, within scheduler address space there is also provided control information referred to in FIG. 2 as scheduler control data block 36d. For example, information stored in this block includes information concerning the idle status of the initiators which are in pool 50. Accordingly, it is the information illustrated in FIG. 2 and in FIG. 1 that controls the creation, destruction, assignment, reassignment and reclamation of initiator address spaces.

More particularly, these processes of creation, destruction, assignment, reassignment and reclamation are carried out in accordance with methods of the present invention which are designed to achieve specific sets of goals established by system managers and/or system programmers. In this manner, computer system managers are provided with a degree of flexibility and control which was not heretofore present.

Figure 3:
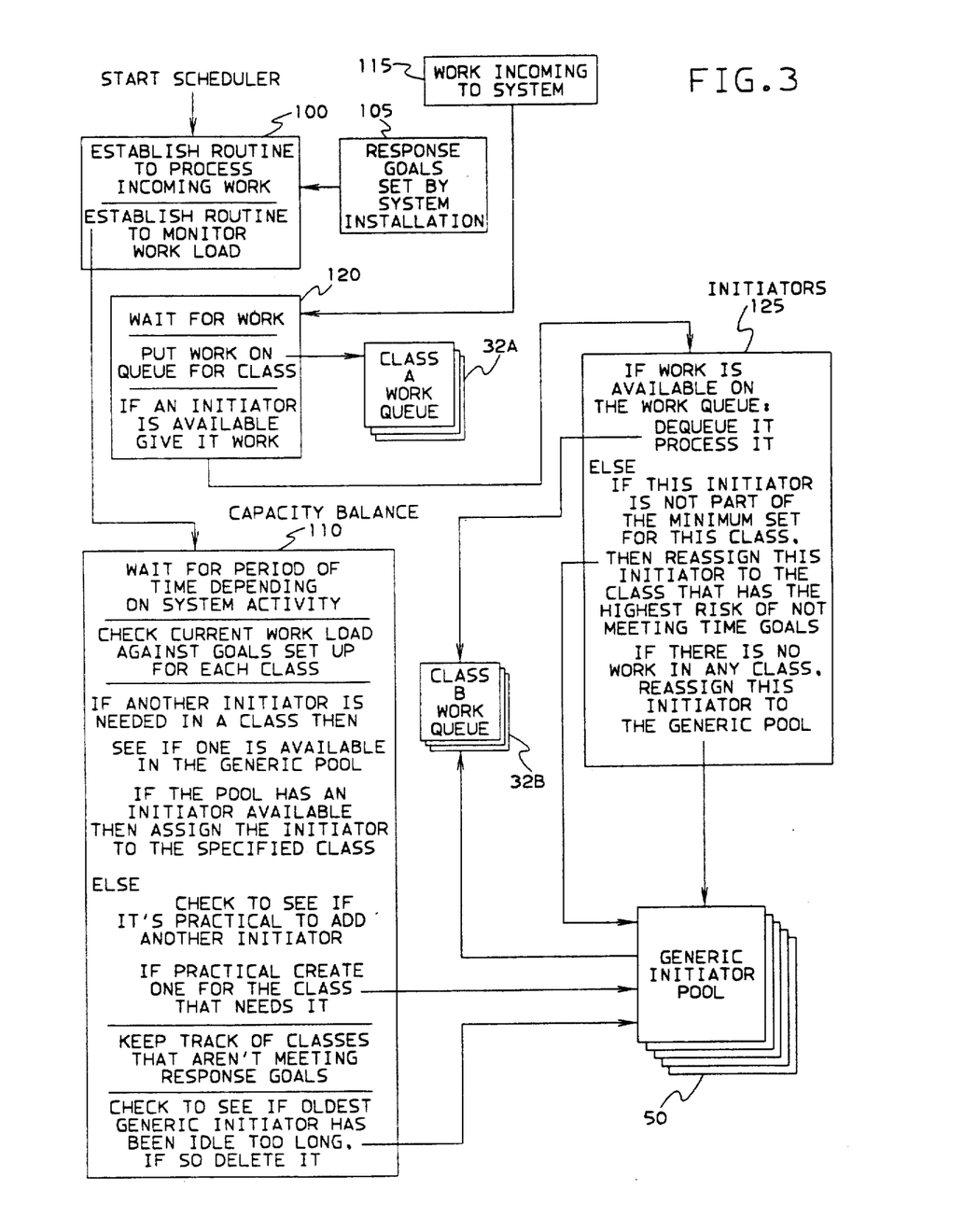
FIG. 3 is a flow diagram illustrating the mechanism employed for managing address space initiators which are now imbued, through linkage with system control blocks, with both fixed and tailorable aspects.
Figure 4A:
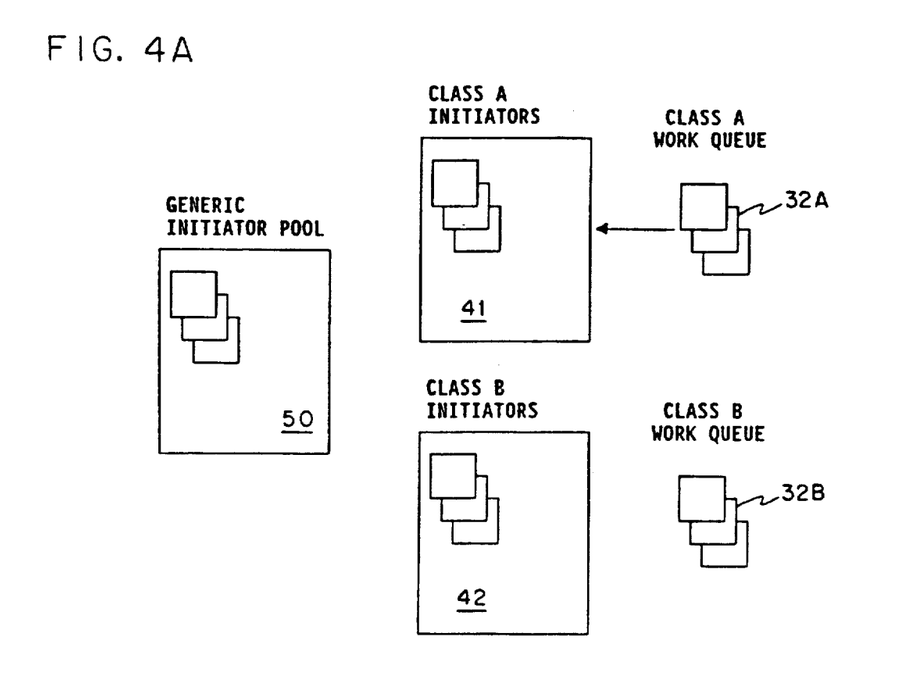
FIG. 4A illustrates the control assignment of an initiator to a particular work class.
Figure 4B:
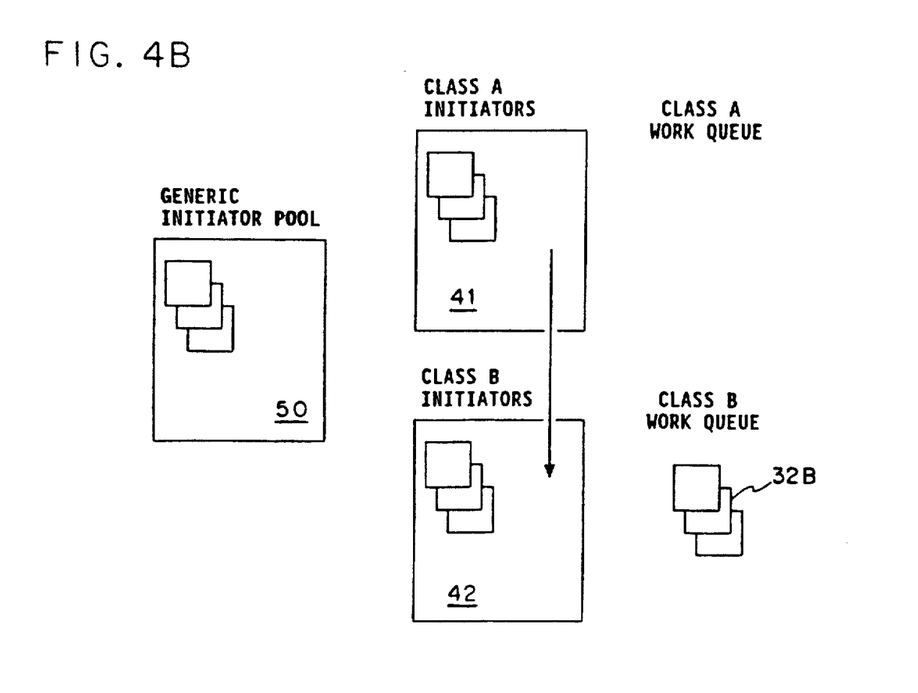
FIG. 4B illustrates the reassignment of an initiator when no work is available for a particular class.
Figure 4C:
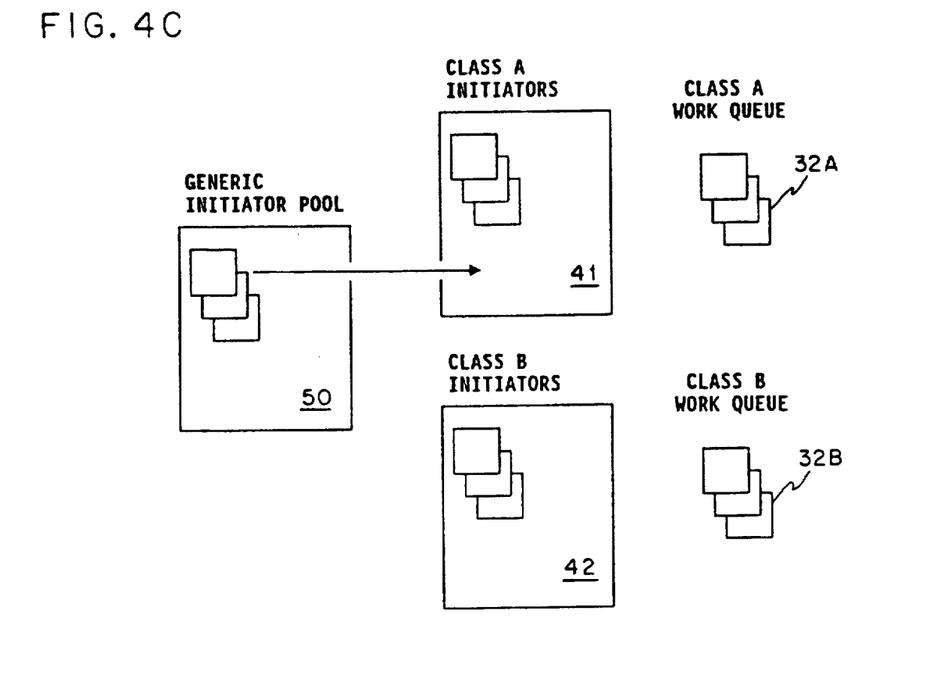
FIG. 4C illustrates the assignment of an initiator from the idle generic pool to a given work class.
Figure 4D:
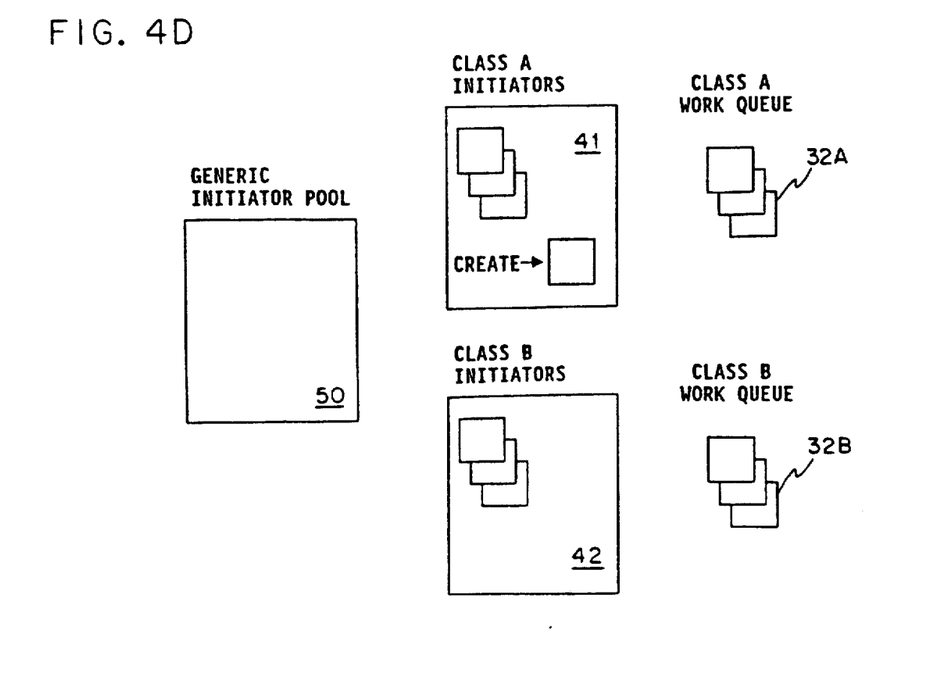
FIG. 4D illustrates the situation in which an initiator is created and that it is created for a given work class.
Figure 4E:
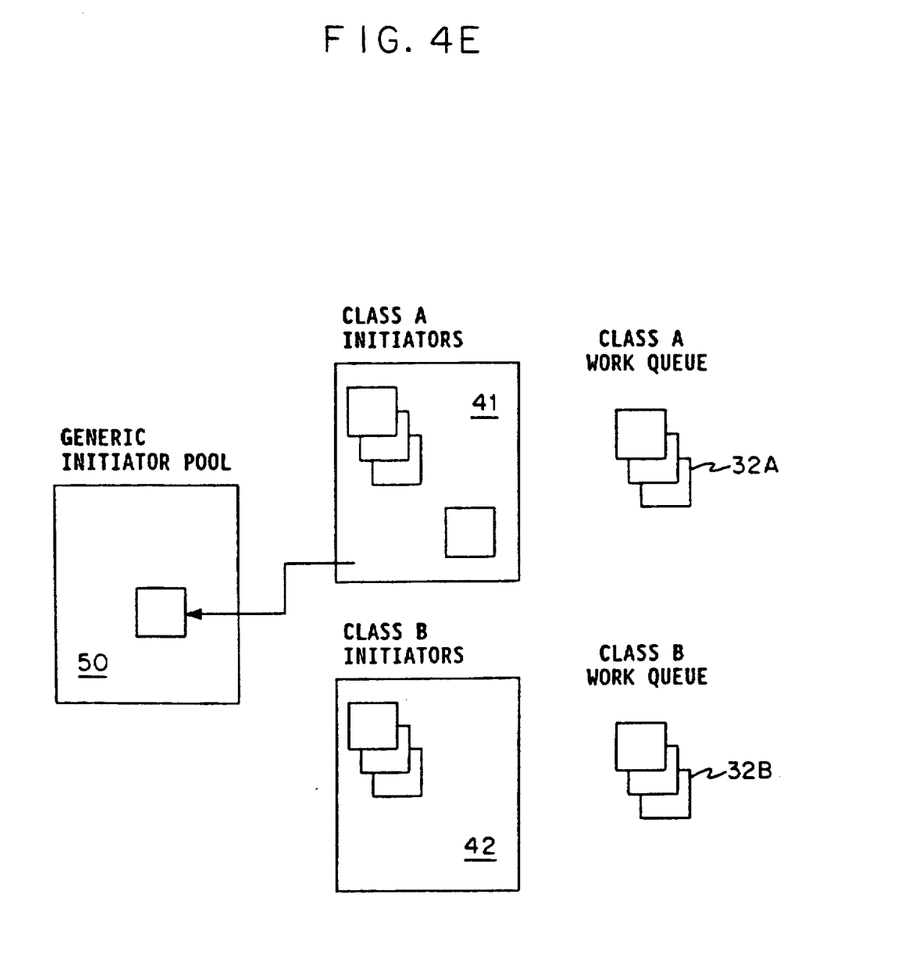
FIG. 4E illustrates the situation in which an initiator is returned to the idle generic pool.

Accordingly, specific details of the methods employed in the present invention are now provided. Subsequently, an overview of these methods, as expressed in FIG. 3, is also provided below along with more specific representations of initiator transfer under various conditions of workload and predefined parameters.

In accordance with the present invention, it is now possible for computer system programmers and/or managers to determine, for various work categories, the maximum desired response time for each class of work and upper and lower bounds on the number of initiators that are allowed to serve that workload.

Work units enter the system through input services 61 described above. If there is an initiator which has an idle status and that initiator is assigned to the class with which that work is associated, the work unit is assigned to that initiator and begins execution. Otherwise, the work unit is queued and waits until an initiator of that class is available. When an operating system, such as the MVS Operating System developed by the assignee of the present invention, recognizes that an additional initiator is required to be made available to a work unit, the operating system takes action as follows. If there are any initiators in the generic pool, the initiator is removed from the pool and assigned to the work unit. If the pool is empty, the operating system creates a new initiator and assigns it to the work unit. The concept of a generic initiator pool allows schedulers to move generic initiators from the generic initiator pool to any class or group that requires an initiator to process work units. When the operating system determines that an initiator is no longer needed by a class of work, then that initiator is reassigned to the class most at risk of not meeting its response time goals. Also, the above processing method contemplates the presence of idle initiators both in the generic pool and in the sets of assigned initiators. A significant advantage is achieved in this mode of operation since it is no longer necessary to have to frequently create initiator address spaces from scratch.

The structure and signal flow paths illustrated in FIG. 1 which illustrates the utilization of the generic initiator concept also provide an opportunity for structuring methods to manage the creation, destruction, assignment, reassignment and reclamation of initiator address spaces. Accordingly, a method for fine tuning the number of initiators is described herein and is based on a new internal system variable defined as the "mean time to wait" (MTW). Accordingly, for each class of work a mean-time-to-wait threshold is established. (This threshold is defined more specifically below.) The method employed herein uses fundamental relationships between response time, service time (execution time) and wait time to determine how long a work unit is permitted to wait for an initiator before the system takes action to get the work unit into execution. When there are idle initiators already assigned to a class, the system is not required to take any other action to bring another initiator into service, instead, the selection logic causes waiting work units to dequeue and to be assigned to the initiators that are waiting for work. However, when there are no idle initiators assigned to a class, waiting work queues up for longer periods of time. Even though counted in fractions of a second, this elongated queue delay eventually becomes too long unless another initiator is brought into service and assigned to the class. The "mean time to wait" method calculates a threshold value per class of work that is the average time that work units in that class can remain waiting on the work queue before a new initiator is added for that class.

In the present invention, the system installation is now able to provide upper bounds for the response time goal for each transaction work unit. The system operator also provides a range giving upper and lower bounds on the number of initiators that can exist for a class.

The operating system monitors several indicators in the system. This is typically done through System Resource Manager SRM (62). In particular, the average elapsed time a work unit spends associated with an initiator in execution or service mode for each class of work is tracked. As indicated above, the mean-time-to-wait (MTW) threshold per class is defined as the response time goal minus the average service time. More particularly, the response time goal is one of the parameters externally set by system operators and is typically updated and maintained in a DASD library called PARMLIB which is specified by the system installation personnel. The "average service time" is a running average of the last 100 completed jobs or transactions for a particular class. In this regard, it is noted that there is nothing special about the selection of the number 100 other than that it provides a good measure of previous system performance. In addition, the operating system monitors the queue delay time experienced for the previous 100 jobs or transactions in each class. The queue delay time is the time that work actually resides on the scheduler queue 32 while waiting for an initiator.

As long as the average queue delay is less than or equal to the mean-time-to-wait (MTW) threshold, work is allowed to wait on the scheduling queue. However, when the average queue delay exceeds the MTW threshold, a new initiator is added for the class, as long as that class does not yet exceed the maximum number of initiators which is set for it by the installation operators in the PARMLIB file. Again this is system programmer and/or system manager controllable data. Regardless of the average response time within a class, the number of initiators operating on the class is not allowed to exceed the maximum value. This avoids the over supply of initiator address spaces.

Discussion is now directed to the situation in which adjustment is made for increasing the number of initiators. The operating system scheduler becomes active at specified time intervals based on how the previous workload balancing processing went. That is to say, workload balancing indicators specify to the scheduler whether any initiators are needed to be added as opposed to leaving the existing initiator allocations as they are. The scheduler becomes active less frequently in a system that is balanced, meaning one that requires little adjustment, so as to minimize operating system overhead. With each invocation of the scheduler to balance workload, all classes of work units are checked to see if more initiators are required. If it is determined that an initiator needs to be added to a particular work class, the scheduler first tries to obtain an initiator from the generic pool and if none are available there, an initiator is created for that class. The scheduler assures that bringing up an additional initiator will not cause class limits to be exceeded and that all classes are at or above their specified minimum number. This method addresses the potential situation in which an address space terminates or is cancelled and causes a class to fall below the minimum number of initiators defined for it in the PARMLIB data set. (It should be appreciated though that this PARMLIB data is also preferably maintained as resident in faster main memory in addition to its quasi-permanent status on DASD devices.)

It is possible to create more than one initiator in a single scheduler activation period. For instance, the scheduler may check class A and build an initiator for class A and then check class C and build an initiator for class C. However, within a particular class, it is preferred that no more than one initiator is created during a single scheduler activation period. That is, it is preferred that the scheduler does not check class A and build two class A initiators. If an initiator was started by a prior invocation of the scheduler to balance the system workload and the initiator is not completely initialized, no new initiator is started by the current activation of the scheduler to balance the workload. This prevents the scheduler from overloading a system that is already bogged down by the addition of new initiators with no concomitant introduction of new work to the system.

Attention is now focused on the specific mechanism for the reassignment of initiators. When an initiator is created, it is assigned to a specific class and processes work from that class until no more work is available. When no more is available in that class, an initiator is reassigned to another class provided the reassignment does not cause the source class to go below the minimum number of initiators specified for the source class. Again, this is set as a system operating parameter by a system operator within the PARMLIB data set. The scheduler keeps track of the classes with the highest risk of not meeting response time goals. Reassignment of initiators is first directed toward these classes.

Attention is now toward consideration of the situation in which excess initiators are terminated (destroyed). When there is no more work for an initiator in any of the classes, the initiator is assigned to the generic initiator pool. If an initiator is needed by a specific work class, the last initiator assigned to the generic pool is the first one selected since it has the highest priority of not being swapped out of the system. This provides decided system throughput advantages. When the scheduler determines that one or more initiators have been idle for several minutes, the oldest initiator in the group is destroyed. It is preferred that no more than one initiator is destroyed per scheduler activation period.

The assignment, reassignment, creation, destruction and reclamation of initiator work spaces is particularly illustrated in block diagram form in FIG. 3. It is noted that when the scheduler is started (see block 100) a routine is established to process the incoming work. Another routine is established to monitor the workload. These routines employ response time goals which are set by the computing system installation staff (see block 105). Once these routines are established (see block 100), the scheduler is free to carry on its capacity balancing function (see block 110). Here, the scheduler waits for a period of time which generally depends on system activity, the greater the activity the shorter being the period of waiting time. The scheduler then checks the current workload against goals set up for each class. If another initiator is needed in a class, then the scheduler determines if one is available from generic pool 50. If the pool has an initiator available, then it is assigned to the specified class. Otherwise, the scheduler checks to see if it is desirable to add another initiator. If practical, an initiator is created for the class that needs it. Note that it is preferred that initiators not be created for immediate deployment to generic initiator pool 50. The scheduler also keeps track of classes that are not meeting response time goals. Additionally, the scheduler checks to see if the oldest generic initiator has been idle too long. If so, it is deleted (destroyed).

Once capacity balancing operations as carried out in function block 110) are established by parameters set up by the system operators (see block 105), the system is able to process work coming into the system (see block 115). If necessary (see block 120), the operating system waits for work and when it arrives the scheduler places it on a queue for the class with which it is associated. If an initiator is available (see block 120), it is assigned to the work queue associated with that class. For example, FIG. 3 illustrates the possibility of the assignment of an initiator to work in the class A work queue. Processing then continues (see block 125) wherein work on the work queue is taken off the queue and processed using the assigned initiator address space. Additionally, it is noted that if the initiator is not part of the minimum set of initiators for this class, then it is reassigned to the class that has the highest risk of not meeting time goals. If there is no work in any class, this initiator is reassigned to generic pool 50. This is the so-called initiator reclamation process. In the particular example shown in FIG. 3, it is seen that an initiator from generic initiator pool 50 is assigned to the class B work queue 32b.

FIG. 4 illustrates in a slightly different fashion the various operations associated with the generic initiators of the present invention. In particular, it is seen in FIG. 4A that initiators from class A process work from the class A work queue 32a as long as this queue is not empty. If there is no work in the class A work queue, which is available for a class A initiator, then the initiator is assigned to the class with the greatest risk of not meeting its response time goals. In particular, FIG. 4B illustrates the case in which the class with the greatest risk is designated as class B. FIG. 4C illustrates the situation in which an initiator from the generic pool is available and is assigned to the class A initiators in response to a situation in which the work in class A is not meeting its response time goals. FIG. 4D illustrates the situation in which no initiators are available in the generic pool when need arises in a work class. Here a new class A initiator is created in class A, for example when class A is not meeting its response time goals. Likewise, in FIG. 4E if it happens that there is no class of work which is at risk of meeting its time goals, a newly idled initiator is returned to generic initiator pool 50.

From the above, it should be appreciated that the utilization of generic initiators together with the processing method described for their creation, destruction, assignment, reassignment and reclamation provide a number of benefits. For example, system overhead is reduced by not unnecessarily creating and destroying initiators when reacting to spikes in the work arrival pattern. This is accomplished by monitoring by class the growth in queue delays so that initiator creation is done only when necessary. The amount of time that work waits in a queue is also reduced. Initiators remain defined to a class for a short time after they appear to be idle so as to minimize the assignment/reassignment overhead that would otherwise be incurred if the initiators always went back to the generic pool and then were made ready for new kinds of work. Additionally, idle initiators and the system overhead associated with maintaining idle initiators is reduced since initiators do not remain idle and unable to process work for long periods of time. The mechanism of the present invention recognizes when there are extra idle initiators and takes the steps to destroy them. The method of initiator allocation described above controls the time that work spends on the queue by trying to have enough initiators available on a per class basis to process the work load. This assures that work is processed within the goals set up for that class. Without this support, computer installations have manually tuned the number of initiators to guarantee selection of an initiator in time to meet a response time goal. When responsiveness is important, it is expected that an installation would have to define an excessive number of initiators thus utilizing more system resources than is necessary to serve the workload. This invention eliminates this inefficiency. Additionally, it is noted that the generic initiators described herein possess the ability to process work from any class or group. By varying the frequency with which the scheduler needs to react to balancing the workload, the scheduler becomes more sensitive in making adjustments to the workload during the times it is most needed. That is, the scheduler "wakes up" more frequently when the workload is unbalanced and tends to "sleep" longer thus taking up fewer system resources, when the workload is balanced. By selecting the last initiator assigned to the generic initiator pool when an initiator is needed by a class, the probability that the address space is swapped out in accordance with virtual memory operations, is also reduced. Obtaining an unswapped address space in this manner therefore is seen to increase system performance and causes lower system overhead. By keeping a current list of the most critical classes in jeopardy of meeting their respective response time goals, the scheduler can instantaneously reassign initiators in a class that has run out of work to those classes that do have work. Also, generic initiators can reduce the overhead of creating an initiator when work comes into a class or group that has no initiators defined to it. Thus resources are used more efficiently and unused resources are not left idle. Furthermore, system users do not have to predefine the number of initiators in a particular class or group that could cause either delays in work being processed if the number of initiators is defined too low or cause resources to be left idle or unused if the number of initiators defined is too high.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for enhancing the speed of processing in a computer system having an operating system and virtual memory capability, said method comprising the steps of:

creating unassigned address spaces as necessary in accordance with predetermined parameters;

storing in a control block accessible to said operating system fixed control information specific to programs to be run in at least one of said address spaces;

storing in a control block accessible to said operating system information indicating address space status;

storing in a control block accessible to said operating system tailorable control information specific to particular classes of work to be run in at least one of said address spaces by said computer system and;

assigning said address spaces to specific units of work requested to be performed in said computer system.

2. The method of claim 1 in which said tailorable operating system control information includes information as to the maximum desired response time for work in said respective class.

3. The method of claim 1 in which said tailorable operating system control information includes information as to the maximum number of address spaces that may be assigned to a particular class of work.

4. The method of claim 1 in which said tailorable operating system control information includes information as to the minimum number of address spaces that may be assigned to a particular class of work.

5. The method of claim 1 further including the step of identifying to said operating system a set of said address spaces having an indication that at least one of said set of address spaces is idle.

* * * * *